E. Allen,
Making Cartridge Cases.

No. 1,948. Reissued May. 9. 1865.

Witnesses;
Geo. W. Fairfield
Jas. G. Arnold

Inventor;
Ethan Allen

UNITED STATES PATENT OFFICE.

ETHAN ALLEN, OF WORCESTER, MASSACHUSETTS.

MACHINE FOR MAKING CARTRIDGE-CASES.

Specification forming part of Letters Patent No. 27,094, dated February 14, 1860; Reissue No. 1,948, dated May 9, 1865.

DIVISION No. 1.

*To all whom it may concern:*

Be it known that I, ETHAN ALLEN, of the city and county of Worcester, and State of Massachusetts, have invented certain new and useful Improvements in Machinery for making Loaded Caps or Cap-Cartridges; and I hereby declare the following to be a full, clear, and exact description of the construction and operation of the same, reference being had to the accompanying drawings, in which—

Figure 1:
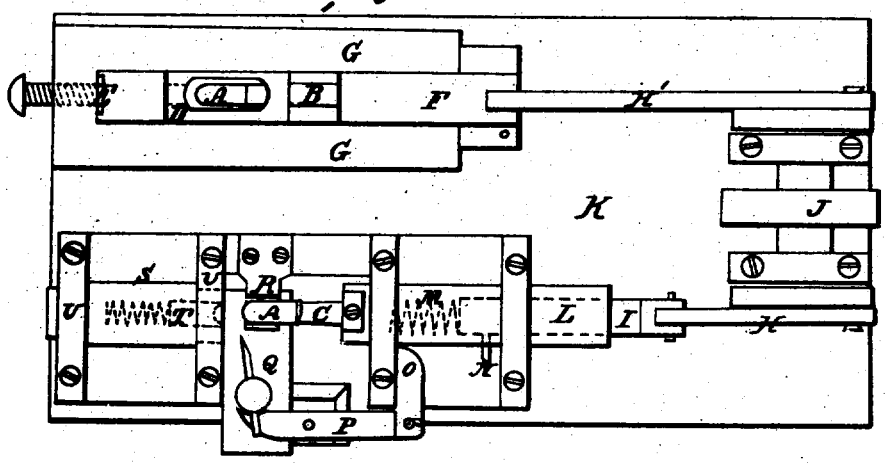
Figure 2:
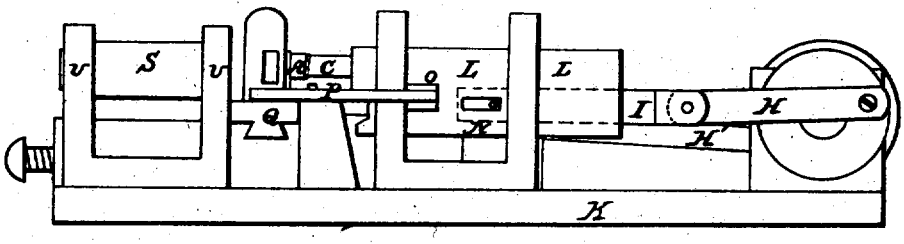
Figure 2:
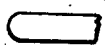
Figure 2:
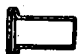

Figure 1 is a top view or plan, and Fig. 2 is a side view and pertains to a machine which is the subject of another reissue of these Letters Patent.

My improvements relate to the construction or formation of the case of a metallic cartridge; and it consists in an arrangement of mechanism for forming or striking-up the swelled end to form the recess for the priming, as shown at Z, from that of Y, at one stroke or operation, in distinction from spinning them up, as has heretofore been done.

The construction of my improvements, as shown in the drawings, is as follows: K is the base of the machine; J, the driving-pulley, which is provided with a crank or eccentric, to which the rod H′ is connected.

F is a slide, receiving motion by H′ and moving in ways G G, carrying the mandrel B, which passes through the die D. The die D has a spring, to keep or move it back toward F, and a hopper-like opening in the upper side to facilitate placing the case A to be taken by B and carried into the die D. The mandrel B has a shoulder a sufficient distance from the end to allow it to enter the cartridge-shell just the right distance and leave enough metal to be fulled into the head of the cartridge. The die D is just the right size to be filled by the shell A when pressed into it by the punch or mandrel B.

E is a die with an adjustable screw, and the case may be carried against it to form the head or rim, or that may be carried against the die D by similar mechanism to F and H′.

Z is a case or shell, after being headed, forming the cavity for the fulminating-powder.

The operation is as follows—viz: Motion being given to pulley J is communicated through H′ to F and B, and the case or shells are placed in the recess or in an inclined tube, which feeds them to the punch B. The shell is taken on the punch B and carried through the die D until the end projects sufficiently to form its rim, when F, meeting D, carries it with A in that position up against E, which flattens the end and forms the hollow rim, as shown in section at Z, Fig. 2, and, the motion of J continuing, the parts all return to their respective places ready for another shell, which during the same time has been placed in position, as before described, and the punch B, taking on another shell, is carried into the die D and presses out the one before headed, which drops between the dies D and E, when the operation is repeated as before.

I claim—

1. The mandrel which carries the cartridge-shell, in combination with the die D, which admits the same, and against which the closed end of the cartridge-shell is headed, substantially as described.

2. The die D, constructed and operating for the heading of cartridge-shells, substantially as described.

Witnesses: ETHAN ALLEN.

S. FOREHAND,

GEO. W. FAIRFIELD.